(12) United States Patent
McGrath

(10) Patent No.: US 10,906,413 B2
(45) Date of Patent: Feb. 2, 2021

(54) CHARGING SYSTEM INCLUDING OPERATIVELY INDEPENDENT CHARGERS FOR AN ELECTRIC VEHICLE

(71) Applicant: Proterra Inc., Burlingame, CA (US)

(72) Inventor: Seamus McGrath, Simpsonville, SC (US)

(73) Assignee: Proterra Inc., Burlingame, CA (US)

( * ) Notice: Subject to any disclaimer, the term of this patent is extended or adjusted under 35 U.S.C. 154(b) by 137 days.

(21) Appl. No.: 16/205,825

(22) Filed: Nov. 30, 2018

(65) Prior Publication Data

US 2020/0171964 A1 Jun. 4, 2020

(51) Int. Cl.
*B60L 53/00* (2019.01)
*B60L 53/16* (2019.01)
*B60L 53/30* (2019.01)

(52) U.S. Cl.
CPC .............. *B60L 53/16* (2019.02); *B60L 53/30* (2019.02); *B60L 2200/18* (2013.01); *B60L 2210/10* (2013.01); *B60L 2210/30* (2013.01)

(58) Field of Classification Search
CPC ...... B60L 53/16; B60L 53/30; B60L 2210/30; B60L 2210/10; B60L 2200/18; B60L 53/11; B60L 53/62; Y02T 90/12; Y02T 90/14; Y02T 10/7072; Y02T 10/70
See application file for complete search history.

(56) References Cited

U.S. PATENT DOCUMENTS

| | | | | |
|---|---|---|---|---|
| 4,158,802 A * | 6/1979 | Rose, II | ................ | H02J 7/0042 320/109 |
| 8,138,718 B2 * | 3/2012 | Dower | .................. | H02J 7/0045 320/109 |
| 8,307,967 B2 * | 11/2012 | Patwardhan | ......... | H01R 13/629 191/2 |
| 8,324,858 B2 | 12/2012 | Hill et al. | | |
| 9,352,658 B2 | 5/2016 | Morris et al. | | |
| 9,718,367 B2 * | 8/2017 | McGrath | ................. | B60L 53/68 |
| 9,809,122 B2 | 11/2017 | McGrath et al. | | |
| 10,115,247 B2 * | 10/2018 | Alm | ........................... | B60L 7/14 |
| 10,232,724 B2 * | 3/2019 | Morris | .................... | B60L 53/18 |
| 10,377,251 B2 * | 8/2019 | McGrath | ................. | B60L 53/14 |
| 10,427,530 B2 * | 10/2019 | Ricci | ....................... | B60L 53/32 |
| 10,434,889 B2 * | 10/2019 | Buehs | ................. | B60L 11/1827 |
| 10,608,556 B2 * | 3/2020 | Smidt | ...................... | H02J 7/022 |
| 2009/0121678 A1 * | 5/2009 | Mitake | ....................... | B60L 5/42 320/109 |
| 2012/0280656 A1 * | 11/2012 | Bedell | ....................... | B60L 5/42 320/109 |
| 2013/0193918 A1 * | 8/2013 | Sarkar | ..................... | B60L 15/10 320/109 |

(Continued)

*Primary Examiner* — Naum Levin
(74) *Attorney, Agent, or Firm* — Bookoff McAndrews, PLLC

(57) ABSTRACT

A charging station for charging an electric vehicle may include a first pair of charging electrodes electrically connected to a first charger and a second pair of charging electrodes electrically connected to a second charger electrically isolated from the first charger. The first pair charging electrodes may be configured to make contact with and provide power to a first pair of charge-receiving electrodes of the electric vehicle, and the second pair charging electrodes may be configured to make contact with and provide power to the first pair of charge-receiving electrodes of the electric vehicle.

20 Claims, 7 Drawing Sheets

(56) References Cited

U.S. PATENT DOCUMENTS

| | | | |
|---|---|---|---|
| 2015/0047947 A1* | 2/2015 | Tait | B60L 53/305 |
| | | | 198/339.1 |
| 2016/0130851 A1* | 5/2016 | Storm | B60L 50/53 |
| | | | 49/31 |
| 2016/0167524 A1* | 6/2016 | Bedell | B60L 53/14 |
| | | | 191/22 R |
| 2017/0080813 A1* | 3/2017 | Bedell | B60L 53/16 |
| 2017/0158074 A1* | 6/2017 | Buehs | B60L 11/1827 |
| 2019/0047425 A1* | 2/2019 | Tajima | B60L 5/36 |
| 2019/0193585 A1* | 6/2019 | Raaijmakers | B60L 53/16 |
| 2019/0389497 A1* | 12/2019 | Golpe | B60L 53/32 |
| 2020/0039370 A1* | 2/2020 | Hom | B60L 53/32 |
| 2020/0062138 A1* | 2/2020 | Smolenaers | B60L 53/62 |

* cited by examiner

CHARGING SYSTEM INCLUDING OPERATIVELY INDEPENDENT CHARGERS FOR AN ELECTRIC VEHICLE

TECHNICAL FIELD

Various embodiments of the present disclosure relate generally to charging systems for an electric or hybrid-electric vehicle.

BACKGROUND

An electric vehicle (EV), also referred to as an electric drive vehicle, uses one or more electric motors for propulsion. Electric vehicles may include all-electric vehicles where the electric motor is the sole source of power, and hybrid electric vehicles that include an auxiliary power source in addition to the electric motor. In an electric vehicle, energy may be stored in one or more batteries (located in the electric vehicle) to power the electric motor. When the stored energy decreases, the batteries may be charged (or recharged) by connecting the vehicle to an external power supply. There are many charging systems (over-head charging systems, side charging systems, plugging into a charge port, etc.) that may be used to charge the EV. Although the current disclosure is applicable, without limitations, to any type of EV that may be charged using any type of charging system, an exemplary case of an electric bus being charged using an overhead charging system will be described to illustrate the features of the disclosed system The amount of power that may be directed into an EV using some overhead charging systems (and other charging systems) are limited as a result of single point contacts that may form between charging electrodes of the charging station and charge-receiving electrodes of the EV. Utilizing parallel paths to deliver power may alleviate this problem. However, such an approach may cause practical challenges in keeping the contact resistance between the parallel paths under control. Imbalance in resistance between the different parallel power flow paths causes a current flow imbalance and may cause overheating. To prevent overheating, the system may be monitored for temperature or current through each contact, and overall charge current may be decreased. Decreasing the charge current may result in increased time to charge the EV and thereby decrease operational efficiency.

The present disclosure is directed to overcoming one or more of these above-referenced challenges. The scope of the current disclosure, however, is defined by the attached claims, and not by the ability to solve any specific problem.

SUMMARY OF THE DISCLOSURE

This disclosure provides systems and methods for charging an electric vehicle (EV). Various aspects of the disclosure described herein may be applied to any of the particular applications set forth below or for any other application (e.g., types of vehicles). Aspects of the current disclosure may be applied as a standalone system or apparatus, or as part of an integrated transportation system, such as a bus system or other public transportation system. It shall be understood that different aspects of the disclosure can be appreciated individually, collectively, or in combination with each other.

In one embodiment, a charging station for charging an electric vehicle is disclosed. The charging station may include a first pair of charging electrodes electrically connected to a first charger. The first pair charging electrodes may be configured to make contact with and provide power to a first pair of charge-receiving electrodes of the electric vehicle. The charging station may also include a second pair of charging electrodes electrically connected to a second charger. The second pair charging electrodes may be configured to make contact with and provide power to the first pair of charge-receiving electrodes of the electric vehicle. The first and the second chargers may be isolated chargers.

In accordance with another embodiment, a charging station for charging an electric vehicle is disclosed. The charging station may include a first charging electrode and a second charging electrode electrically connected to a first charger. The first charging electrode may be configured to be a positive power terminal of the first charger and the second charging electrode may be configured to be a negative power terminal of the first charger. Wherein the first charging electrode is configured to contact a first charge-receiving electrode of the electric vehicle and the second charging electrode is configured to contact a second charge-receiving electrode of the electric vehicle. The charging station may also include a third charging electrode and a fourth charging electrode electrically connected to a second charger, with isolated outputs from the first charger, wherein the third charging electrode may be configured to be a positive power terminal of the second charger and the fourth charging electrode may be configured to be a negative power terminal of the second charger. Wherein the third charging electrode may be configured to contact the first charge-receiving electrode of the electric vehicle and the fourth charging electrode may be configured to contact the second charge-receiving electrode of the electric vehicle. The first charger may be configured to vary power output to the first and second charging electrodes independent of the power output of the second charger.

In accordance with another embodiment, a method of charging an electric vehicle at a charging station is disclosed. The method may include electrically connecting a first charging electrode and a second charging electrode of the charging station with a first charge-receiving electrode of the electric vehicle. The first charging electrode may be configured to be a positive power terminal of a first charger and the second charging electrode may be configured to be the positive power terminal of a second charger. The method may also include electrically connecting a third charging electrode and a fourth charging electrode of the charging station with a second charge-receiving electrode of the electric vehicle. Wherein the third charging electrode may be configured to be a negative power terminal of the first charger and the fourth charging electrode may be configured to be the negative power terminal of the second charger. The first and the second chargers may be isolated chargers.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The disclosure provides for systems and methods for charging an electric vehicle (EV). One aspect of the disclosure provides for a charging station that may be used to charge an electric vehicle (EV). The EV may be any type of electric vehicle (i.e., all electric, hybrid, etc.). Although the current disclosure is applicable to any type of EV (car, motorcycle, train, truck, heavy duty vehicle, bus, etc.) that may be charged using any type of charging system (plug in, overhead, side charging, etc.), the exemplary case of an electric bus being charged using an overhead charging system is described below.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Figure 1A:
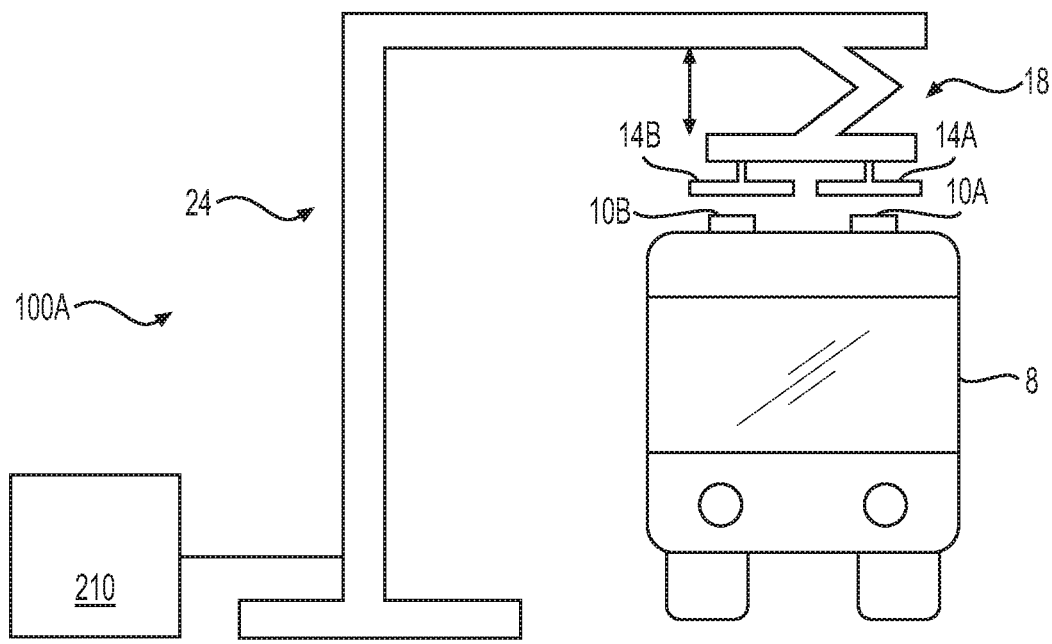
FIGS. 1A and 1B are schematic illustrations of exemplary overhead charging systems of an electric vehicle.

FIG. 1A is a schematic illustration of an electric vehicle 8 (EV 8) charging at an exemplary charging station 100A. As shown in FIG. 1A, the charging station 100A includes a charging connection 18 suspended from a charging mount 24. The exemplary charging connection 18 illustrated in FIG. 1A is an inverted pantograph-type charging connection. Charging connection 18 includes charging electrodes 14A and 14B that are adapted to direct current to the EV 8 during charging. EV 8 includes charge-receiving electrodes 10A and 10B positioned on its roof. The charge-receiving electrodes 10A, 10B are coupled to the battery system of the EV 8. Charging electrode 14A, 14B and charge-receiving electrodes 10A, 10B may be made of any electrically conductive material, and in general, may have any configuration (shape, layout, etc.). When the EV 8 is positioned below the charging connection 18, the charging connection 18 (along with the charging electrodes 14A, 14B) descends to establish physical contact between the charging electrodes 14A, 14B of the charging station 100A and charge-receiving electrodes 10A, 10B of the EV 8. After suitable contact is made (e.g., between charging electrode 14A and charge-receiving electrode 10A, and charging electrode 14B and charge-receiving electrode 10B), current is directed from charging station 100A to the EV 8. After charging, the charging connection 18 ascends to separate the charging electrodes 14A, 14B from the charge-receiving electrodes 10A, 10B.

Figure 1B:
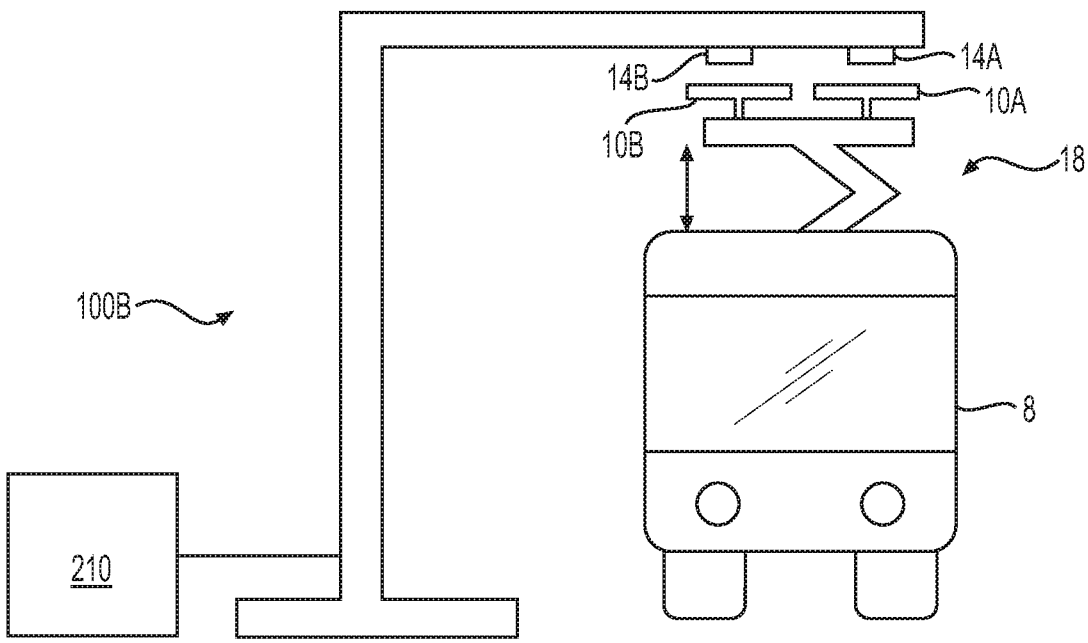

In some embodiments, the pantograph-type charging connection 18 may be attached to the roof of the EV 8. FIG. 1B illustrates an exemplary charging station 100B with the charging connection 18 on the roof of the EV 8. In such embodiments, the charge-receiving electrodes 10A, 10B of the EV 8 are attached to the charging connection 18 (i.e., configured to move with the charging connection 18) and the charging electrodes 14A, 14B are attached to an overhanging structure (e.g., overhanging roof, beam, etc.) of the charging station 100B. With reference to FIG. 1B, when the EV 8 is positioned below the charging connection 18, the charging connection 18, along with the charging electrodes 14A, 14B, ascends so that charge-receiving electrode 10A contacts the charging electrode 14A and the charge-receiving electrode 10B contacts the charging electrode 14B. After charging, the charging connection 18 is lowered back to the roof of the EV 8. The charging connection 18 may be raised from the roof (or lowered towards the roof in charging station 100A of FIG. 1A) by any method (activated by the driver or charging station operator, automatically raised or lowered upon detecting that the EV is at a particular position, etc.). It should be noted that the charging connections 18 illustrated in FIGS. 1A and 1B are only exemplary and the current disclosure is applicable to any type of charging connection. For example, U.S. Pat. Nos. 8,324,858; 9,352,658; and 9,809,122, and International Application No. PCT/US2018/054649, filed on Oct. 5, 2018, incorporated by reference in their entireties herein, describe some configurations of charging connections that may be used with the current disclosure.

Although two charge-receiving electrodes 10A, 10B and charging electrodes 14A, 14B are illustrated in FIGS. 1A and 1B, this is only exemplary. In general, any number of charge-receiving electrodes 10A, 10B and charging electrodes 14A, 14B (2, 3, 4, 6, 8, 10, etc.) may be provided. In some embodiments, the charging electrodes 14A, 14B and the charge-receiving electrodes 10A, 10B may be positioned substantially transverse to each other to accommodate misalignment between the EV 8 and the charging station. In some embodiments, the charge-receiving electrodes 10A, 10B of EV 8 may extend in a direction of vehicle movement (e.g., extend substantially parallel to the length direction, or the longitudinal axis, of the EV 8). See FIG. 1A. In such embodiments, typically, the charging electrodes 14A, 14B extend in a direction substantially transverse to the direction of the charge-receiving electrodes 10A, 10B. That is, in such embodiments, the charging electrodes 14A, 14B may extend substantially transverse to the longitudinal axis of the EV 8. In some embodiments, the charge-receiving electrodes 10A, 10B may extend in a direction substantially transverse to the longitudinal axis of the EV 8, and the charging electrodes 14A, 14B may extend in a direction substantially parallel to the longitudinal axis of the EV 8. See FIG. 1B. However, it is also contemplated that in some embodiments, the charging electrodes 14A, 14B and the charge-receiving electrodes 10A, 10B extend substantially parallel to each other. The configuration (orientation, type, number, etc.) of the depicted charge-receiving electrodes 10A, 10B in FIGS. 1A and 1B are also exemplary. In general, the charge-receiving electrodes 10A, 10B may have any configuration that is compatible with the configuration of the charging electrodes 14A, 14B.

With reference to both FIGS. 1A and 1B, in some embodiments, charging electrodes 14A, 14B and/or charge-receiving electrodes 10A, 10B may include conductive pads or brushes (e.g., copper impregnated carbon pads or brushes). The charging electrodes 14A, 14B (and charge-receiving electrodes 10A, 10B) are electrically insulated from each other (e.g., using insulating elements, air-gaps, etc.). In some embodiments, the charging electrodes 14A, 14B are supplied with power through a charging console 210. Charging console 210 may be positioned in the charging station 100A, 100B or at another location external to EV 8. Charging console 210 may receive power from any suitable power source (e.g., utility grid, external battery storage, solar power, ultra-capacitor, etc.). Charging console 210 may house components (e.g., a charger, and other electrical components) configured to convert the received power to a form that is suitable to be directed to the EV 8.

Figure 2:
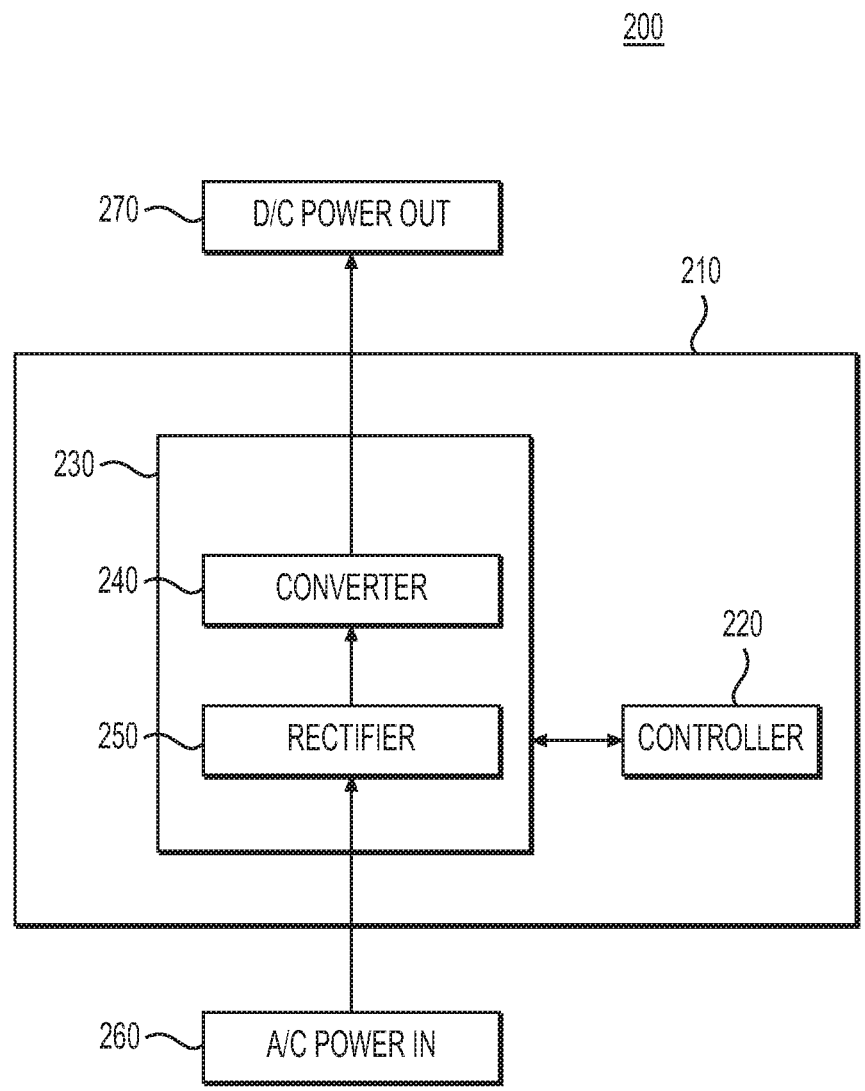
FIG. 2 is a block diagram of an exemplary electric vehicle charging system that employs a single charging circuit.

FIG. 2 depicts a block diagram of an exemplary charging circuit of a charging station. As shown in FIG. 2, charging console 210 may include, or house, a charging unit or a charger 230 and a controller 220. Charger 230 may include, for example, a rectifier 250, and a converter 240. It should be noted that the illustrated components and electrical circuit of the charger 230 is only exemplary. As a person of ordinary skill in the art would recognize, charger 230 may have many other and/or different component and circuits. For example, in some embodiments, in place of rectifier 250, a bi-directional power converter may be provided. With reference to FIG. 2, electric power (i.e., AC current 260), such as from a grid provided by an electric utility, may be converted to DC current 270 using a rectifier 250 (e.g., a bridge rectifier, tritium rectifier, etc.). In some embodiments, a transformer (not shown) may also be provided in the power delivery circuit to lower (or increase) the grid voltage prior to rectification. For example, in some embodiments, the AC power in 260 may be AC current having a voltage between about 12-33 kV, and the transformer may step down this voltage to 750V, and the rectifier 250 may convert the AC current to DC current. The DC current out 270 (at 750V) may then be provided to the charging connection 18 to be directed to the vehicle 8 through the charging electrodes 14A, 14B. In some embodiments, tritium dispensers (not shown) may be provided on the connection 18 to provide power to the vehicle 8. In some embodiments, charging circuit 200 may include a converter 240 (e.g., DC to DC converter) to convert the high voltage DC current from rectifier 250 to a lower voltage that is suitable for charging the vehicle 8. In some embodiments, the converter 240 may be located internal to vehicle 8 (that is, the DC voltage may be stepped down after being directed into the vehicle 8).

The rectifier 250 and the power converter 240 may include electrical devices such as insulated-gate bipolar transistors (IGBTs) and diodes that function to convert the AC current to DC current at the desired power. The conversion of AC current to DC current and the flow of this current to the vehicle 8 produce heat. At 95% conversion efficiency, about 25 kW of heat is generated while performing a 500 KW charge. A majority of this heat is generated in the charging console 210. In some embodiments, a coolant (air, water, or another fluid) may be circulated through the charging console 210 to collect the heat produced therein, and discharge the collected heat away from the charging console 210. Charging console 210 may further include a controller 220, which may provide operator controls for controlling the operation of charger 230. Controller 220 may also perform automatic diagnostics and control of components of the charging console 210, including operation of charger 230.

As discussed above, in some cases, a charging system having a single charging circuit (e.g., FIG. 2), may incur overheating of electrically conductive surfaces (e.g., charge-receiving electrodes 10A, 10B and/or charging electrodes 14A, 14B), forcing a reduction in overall current. Such a reduction in overall current may lead to increased charge time and vehicle down time. FIGS. 3A-3D illustrate exemplary circuit diagrams of a charging system charging an electric vehicle. In the illustrations of FIGS. 3A-3D a contacting pair of charging electrode and charge-receiving electrode is identified as a "contact."

Figure 3A:
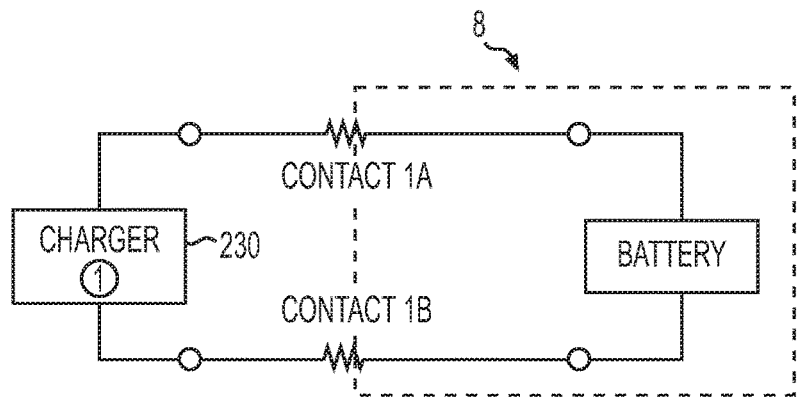
FIGS. 3A-3D are exemplary circuit diagrams of an EV being charged by a charging system.
Figure 3B:
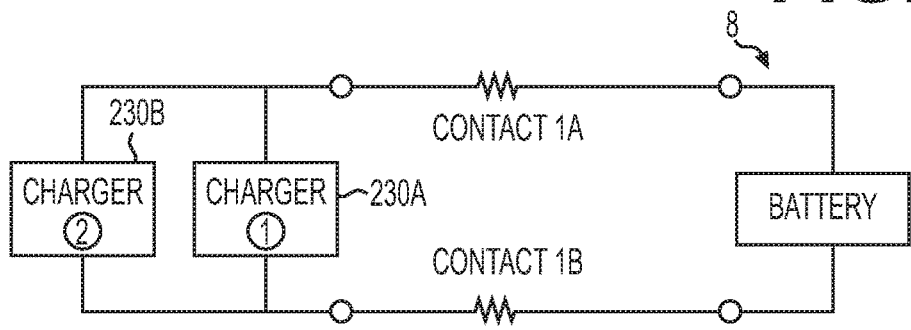
Figure 3C:
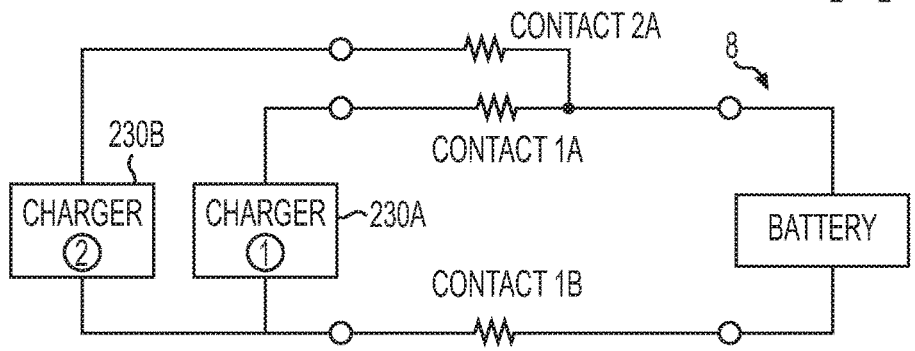
Figure 3D:
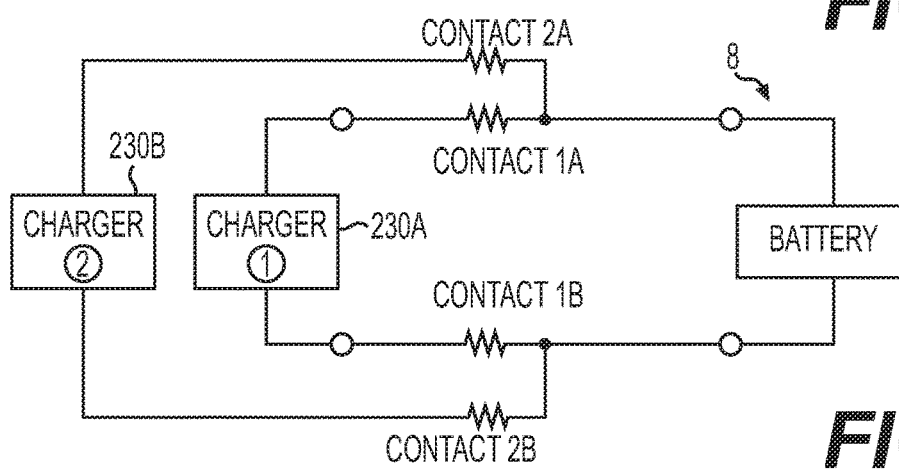

FIG. 3A illustrates a basic circuit where a single charger 230 charges the battery system of EV 8. That is, with reference to FIGS. 1A and 1B, a contacting pair of charging electrode 14A and charge-receiving electrode 10A forms contact 1A and a contacting pair of charging electrode 14B and charge-receiving electrode 10B forms contact 1B. FIG. 3B illustrates another exemplary charging circuit. In the embodiment of FIG. 3B, two chargers 230A and 230B provides power to contact 1A and contact 1B. FIG. 3C illustrates another exemplary charging circuit where two chargers 230A and 230B together provide charge (for example, negative value of charge) to one contacting pair of charging electrode and charge-receiving electrode (i.e., contact 1B). In the embodiment of FIG. 3C, two separate charging electrode and charge-receiving electrode pairs are provided to receive the positive value of charge (or vice-versa). That is, a charging electrode 14A(1) and charge-receiving electrode 10A(1) forms contact 1A that provides the positive charge (or negative charge) from a charger 230A, and a charging electrode 14A(2) and charge-receiving electrode 10A(2) forms contact 2A that provides positive charge (or negative charge) from charger 230B. In the embodiment of FIG. 3D, both chargers 230A and 230B are isolated and both contacts are separated. That is, a charging electrode 14A(1) and charge-receiving electrode 10A(1) forms contact 1A that provides the positive charge (or negative charge) from a charger 230A, and a charging electrode 14A(2) and charge-receiving electrode 10A(2) forms contact 2A that provides positive charge (or negative charge) from charger 230B. Similarly, a charging electrode 14B(1) and charge-receiving electrode 10B(1) forms contact 1B that provides the negative charge (or positive charge) from a charger 230A, and a charging electrode 14B(2) and charge-receiving electrode 10B(2) forms contact 2B that provides negative charge (or positive charge) from charger 230B.

With reference to FIG. 3D, typically contact resistance of a contacting pair of charging and charge-receiving electrodes is unknown. As known to people skilled in the art, current follows the path of least resistance. Too much current through a contact may cause problems (overheating, etc.) of the contacting electrodes. In order to ensure that the current through each contacting pair of charging and charge-receiving electrodes is controlled, charger 230A may be isolated from charger 230B. That is, resistance between charger 230A and 230B is high. It should be noted that although charger 230A and 230B are illustrated as separate chargers, this is only exemplary. In some embodiments, chargers 230A and 230B may be isolated outputs from a single charge unit.

Figure 4:
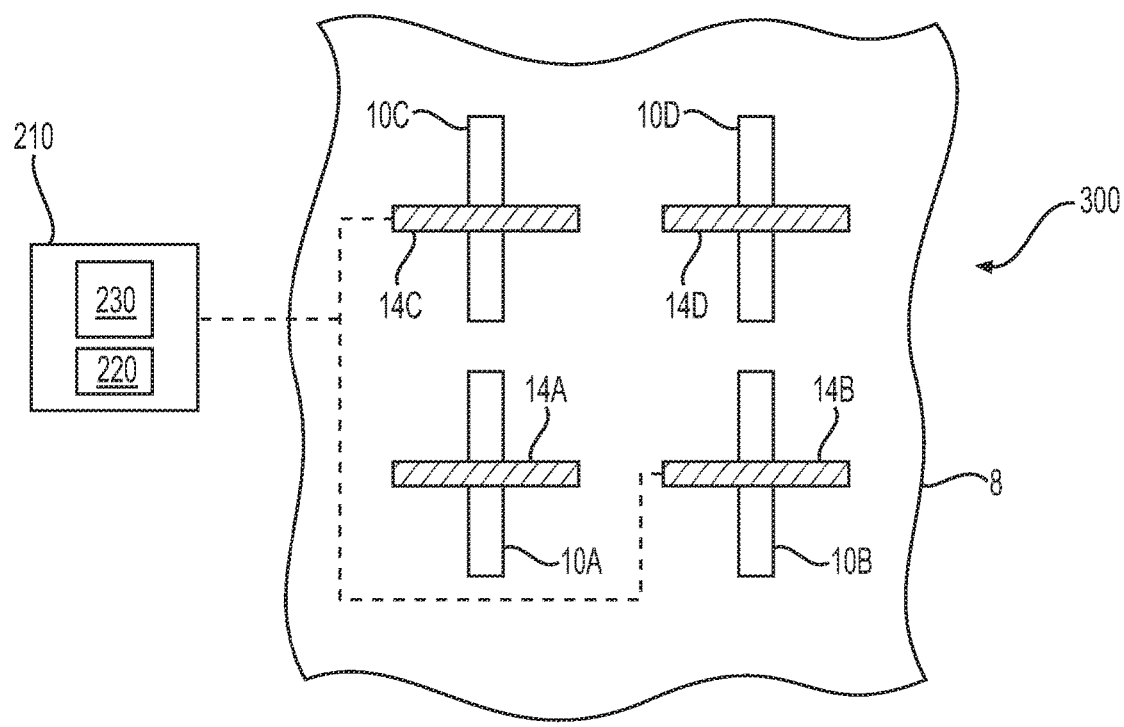
FIGS. 4, 5, 6A and 6B are schematic illustrations of exemplary layouts of charging and charge-receiving electrodes in the charging system of FIGS. 1A and 1B.

FIG. 4 is a simplified schematic illustration of the layout of the charging electrodes 14A-14D of a charging station 300 and the charge-receiving electrodes 10A-10D of the EV 8 during charging using a single charging circuit. In the embodiment illustrated in FIG. 3, the EV 8 includes four charge-receiving electrodes 10A-10B, and the charging station 300 includes four charging electrodes 14A-14D. Each charging electrode 14A-14D (and each charge-receiving electrode 10A-10D) may be electrically isolated from each other (e.g., by an air gap, by an insulating element positioned between them, etc.). As illustrated in FIG. 4, each charging electrode 14A-14D makes contact with a separate charge-receiving electrode 10A-10D while charging the EV 8. Each contacting pair of charging and charge-receiving electrodes (e.g., 14A and 10A, 14B, and 10B, etc.) may provide separate electrical connections for positive, negative, ground, and pilot signals. In some embodiments, a pilot signal may indicate that satisfactory electrical contact has been made between the charging and charge-receiving electrodes 14A-14D, 10A-10D. The arrangement of which electrical signal is associated with which contacting pair of charging and charge-receiving electrodes may vary according to the needs of a particular implementation of the embodiment. For example, in some embodiments, charging electrode 14C may carry the positive electrical signal, charging electrode 14B may carry the negative electrical signal, charging electrode 14D may carry the pilot electrical signal, and charging electrode 14A may be the electrical ground. These charging electrodes 14A-14D may be provided with power by the charger 220 in charging console 210 under the control of controller 220 as described with FIG. 2.

Figure 5:
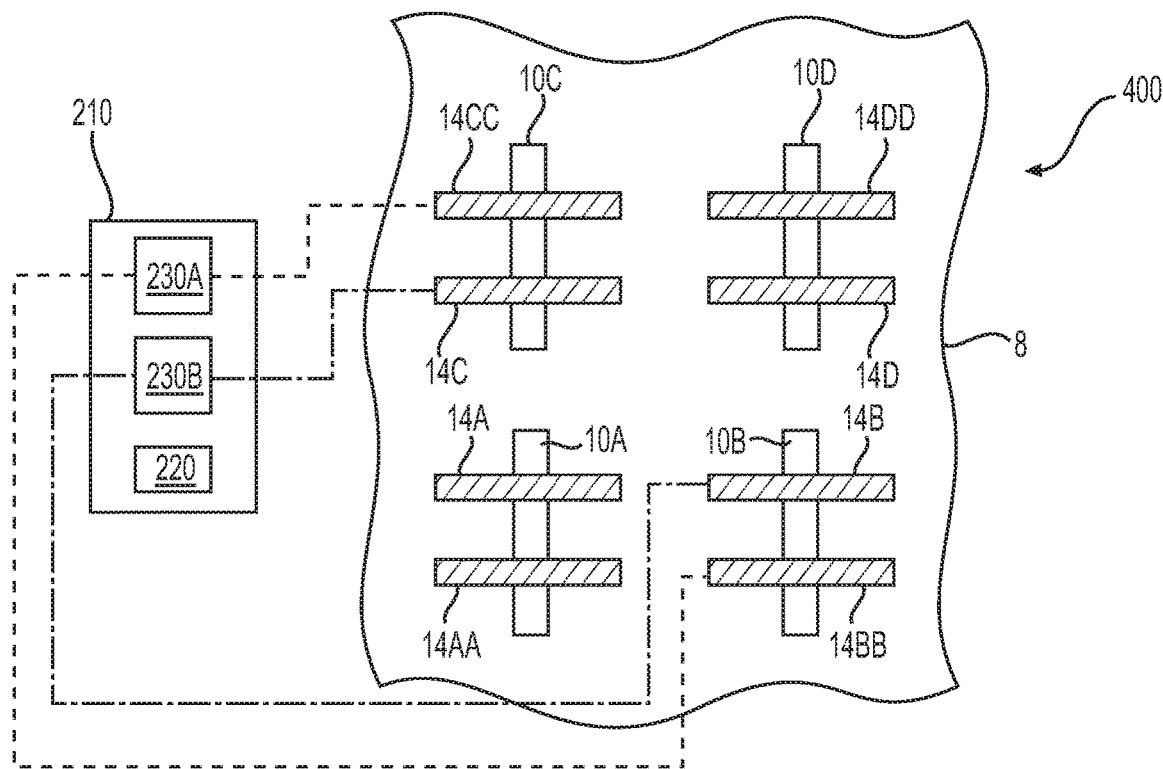

FIG. 5 is a schematic illustration of an exemplary charging station 400 where the charging electrodes of the charging station 400 are powered using multiple (e.g., two) charging circuits. Charging station 400 includes a charging console 210 with a first charger 230A, a second charger 230B, and a controller 220. As illustrated in FIG. 5, two charging electrodes of the charging station 400 make contact with each charge-receiving electrode of the EV 8 to charge the EV 8. That is, charging electrodes 14A and 14AA make contact with charge-receiving electrode 10A, charging electrodes 14B and 14BB make contact with charge-receiving electrode 10B, charging electrodes 14C and 14CC make contact with charge-receiving electrode 10C, and charging electrodes 14D and 14DD make contact with charge-receiving electrode 10D. Each pair of charging electrodes (i.e., 14A and 14AA, 14B and 14BB, etc.) may serve as one of the positive terminal, negative terminal, ground terminal, or pilot terminal. Typically, each pair of charging electrodes (i.e., 14A and 14AA, 14B and 14BB, etc.) are electrically isolated from each other. The arrangement of which electrical signal is associated with which pair of charging electrodes may vary in different embodiments. For example, in some embodiments charging electrodes 14C and 14CC may carry the positive electrical signal, charging electrodes 14B and 14BB may carry the negative electrical signal, charging electrodes 14D and 14DD may carry the pilot electrical signal, and charging electrodes 14A and 14AA may be the electrical ground.

In some embodiments, as illustrated in FIG. 5, each one of a pair of charging electrodes 14A and 14AA (14B and 14BB, 14C and 14CC, 14D and 14DD) may be coupled to a separate charger (230A or 230B). For example, charging electrodes 14A, 14B, 14C, and 14D may be coupled to one charger 230B and charging electrodes 14AA, 14BB, 14CC, and 14DB may be coupled to another charger 230A. That is, charger 230B may provide the positive and negative signals to charging electrodes 14C and 14B respectively, and charger 230A may provide the positive and negative signals to charging electrodes 14CC and 14BB respectively. In some embodiments, these chargers 230A, 230B may be decoupled (or operatively not connected together) from each other. In some embodiments, chargers 230A and 230B may be isolated chargers (independent from each other or not independent from each other). That is, each of these two chargers 230A, 230B may receive external power (from utility grid or another source), condition the power (AC-DC, step down, etc.), and direct the power to one group of charging electrodes (i.e., 14A-14D or 14AA-14DD) independent of the other charger. For example, the power output from one charger 230A can be varied independent of the other charger 230B. In some embodiments, both chargers 230A, 230B may be housed in single charging console 210. However, this is not a requirement. In some embodiments, charger 230A may be housed in a first charging console and charger 230B may be housed in a different charging console.

In some embodiments, both groups of charging electrodes (i.e., 14A-14D or 14AA-14DD) may be powered by the same charger. That is, charger 230A or charger 230B (or charger 230 of FIG. 3) may provide positive electrical signal for both charging electrodes 14C and 14CC and the negative electrical signal for both charging electrodes 14B and 14BB. In such embodiments, the same charging circuit powers both groups of charging electrodes (14A-14D and 14AA-14DD). However, in some embodiments, as explained previously, such a configuration may cause too much current to flow through one contacting pair of electrodes. Although FIG. 5 illustrates the charging electrodes 14A and 14AA (14B and 14BB, 14C and 14CC, and 14D and 14DD) as being positioned substantially parallel to each other, this is only exemplary. In general, these charging electrodes may be positioned and aligned with respect to each other in any manner. During charging, the charging electrodes 14A-14D and 14AA-14DD may get heated. Typically, each electrode of a pair of charging electrodes may be spaced apart to allow heat dissipation and an electrical gap such that voltage flows through the desired contact.

It should be noted that, although FIG. 5 illustrates two charging electrodes (e.g., charging electrodes 14A and 14AA, etc.) being used to provide one type of signal (positive, negative, ground, and pilot), this is only exemplary. In general, any number of charging electrodes may provide the same type of signal to EV 8. For example, in some embodiments, three (four, five, or any number) charging electrodes of the charging station may contact each single charge-receiving electrode (10A-10D) of the EV 8. Each of these three charging electrodes may be connected to the same charger or to separate chargers (i.e., single charging circuit or multiple charging circuits). It is also contemplated that, in some embodiments, different number of charging electrodes may contact different charge-receiving electrodes. For example, two (three, four, or any number) charging electrodes may contact the charge-receiving electrodes that serve as the positive and negative terminals of the EV 8 and a different number (e.g., one, two, etc.) of charging electrodes may contact the charge-receiving electrodes that serve as the pilot and ground terminals.

Figure 6A:
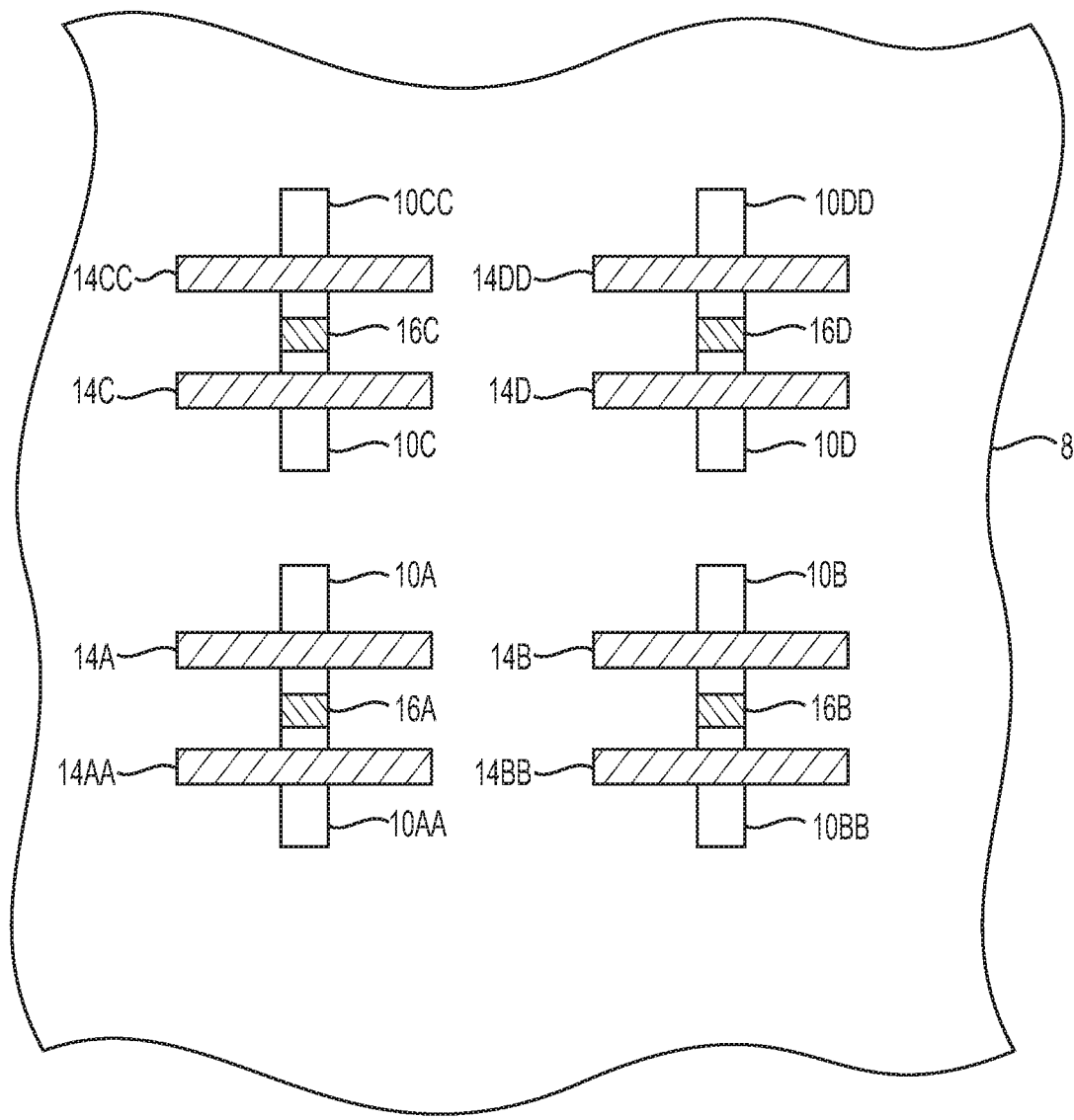
Figure 6B:
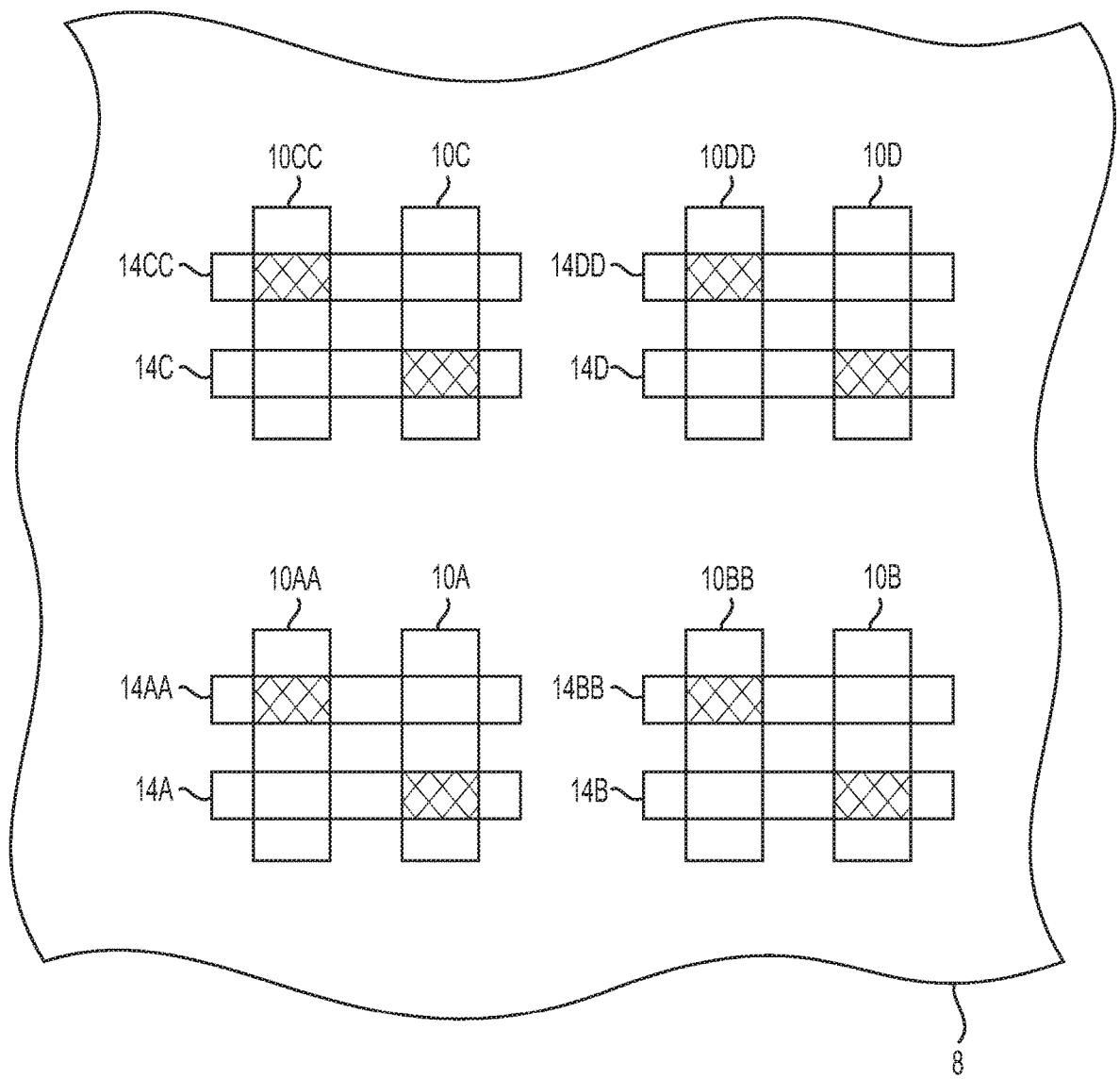

In charging station 400 of FIG. 5, each charge-receiving electrode engages with all the charging electrodes that carry the same type of signal (e.g., charging electrodes 14A and 14AA contact charge-receiving electrode 10A, etc.). In some embodiments, as illustrated in FIGS. 6A and 6B, EV 8 may include separate charging electrodes to contact each charge-receiving electrode. For example, charging electrode 14A contacts charge-receiving electrode 14A, charging electrode 14AA contacts charge-receiving electrode 14AA, etc. Note that in FIG. 6B, a contacting pair of charging and charge-receiving electrodes is illustrated using hatching. Thus, in embodiments where charging electrodes 14C and 14CC both carry the positive electrical signal, these charging electrodes direct the power into the EV 8 via separate charge-receiving electrodes 10C and 10CC. In some embodiments, charge-receiving electrodes 10A and 10AA (and 10B and 10BB, 10C and 10CC, and 10D and 10DD) may be electrically isolated from each other, for example, by an insulating element 16A-16D in FIG. 6A, and by an air-gap in FIG. 6B.

Figure 7:
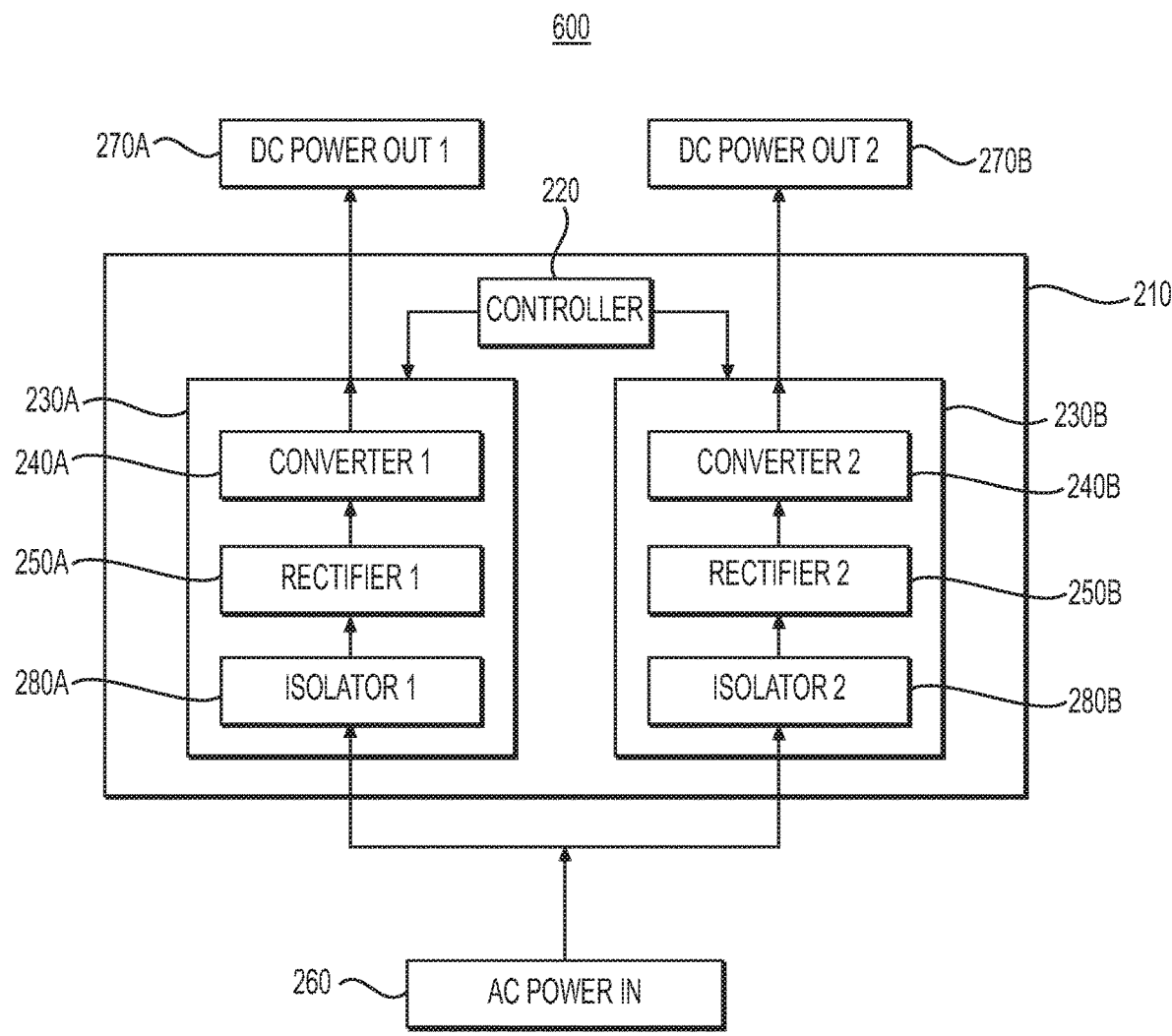
FIG. 7 is a block diagram of an exemplary electric vehicle charging system employing multiple charging circuits.

FIG. 7 depicts an exemplary block diagram of a console 210 comprising multiple charging circuits. As shown in FIG. 6, charging console 210 may include first charger 230A and second charger 230B. As illustrated in FIG. 7, each charger 230A, 230B may include an isolator (280A, 280B), a rectifier (250A, 250B), and a converter (240A and 240B). Both chargers 230A, 230B may be controlled by a single controller 220. The controller function depicted here, dividing the charge current, may be in the charge system or in the vehicle being charged. In such a charging circuit, electric power (i.e., AC current 260), such as from a grid provided by an electric utility, may be directed to both chargers 230A, 230B. Charger 230A converts the input AC current 260 to DC current 270A having the desired voltage and directs it to one set of charging electrodes (e.g., charging electrodes 14A-14D), and charger 230B independently converts the input AC current 260 to DC current 270B having the desired voltage and directs it to the other set of charging electrodes (e.g., charging electrodes 14AA-14DD). The isolator 250A, 250B in each charger 230A, 230B may assist in electrically isolating the power circuit of each charger from the other charger such that the power output of each charger can be independently controlled and varied. Even though the isolator is depicted on the front (i.e., upstream) of the charge system, the isolation function can exist at any point in the charger such that the output of the charger is isolated from the earth (common safety feature) and the other output (required for isolation between chargers). For example, if the EV 8 requires 500 kiloWatts (kW) of power, 200 kW may be provided from charger 230A and the remaining 300 kW may be provided from charger 230B. Controller 220 controls both chargers 230A, 230B so that each charger produces the required amount of power.

In some embodiments, a transformer (not shown) may also be provided in the power delivery circuit to lower (or increase) the grid voltage prior to rectification. For example, in some embodiments, AC current 260 may be AC current having a voltage between about 12-33 kV, and the transformer may step down this voltage to 750V, and each rectifier 250A, 250B may convert the AC current to DC current 270A, 270B. The DC current 270A and 270B (at 750V) may then be provided to the charging electrodes to be directed to the vehicle 8 through the charge-receiving electrodes. This transformer may have multiple outputs so that it serves as both a voltage transformer and an isolator. In some embodiments, chargers 230A, 230B may include converters 240A, 240B (e.g., DC to DC converter) to convert the high voltage DC current from rectifier 250A, 250B to a lower voltage that is suitable for charging the EV 8. In some embodiments, the converters 240A, 24B may be located internal to the EV 8 (that is, the DC voltage is stepped down after being directed into the EV 8). As explained with reference to FIG. 2, the illustrated components and electrical circuit of each charger 230A, 230B is only exemplary.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

I claim:

1. A charging station for charging an electric vehicle, comprising:
a first pair of charging electrodes electrically connected to a first charger, the first pair of charging electrodes being configured to make contact with and provide power to a first pair of charge-receiving electrodes of an electric vehicle; and
a second pair of charging electrodes electrically connected to a second charger, the second pair of charging electrodes being configured to make contact with and provide power to the first pair of charge-receiving electrodes of the electric vehicle,
wherein, the first charger directs power to the first pair of charging electrodes independent of the power directed by the second charger during charging of the electric vehicle.

2. The charging station of claim 1, wherein the first pair of charging electrodes includes a first charging electrode and a second charging electrode, wherein the first charging electrode is configured to be a positive power terminal of the first charger and the second charging electrode is configured to be a negative power terminal of the first charger.

3. The charging station of claim 2, wherein the second pair of charging electrodes includes a third charging electrode and a fourth charging electrode, wherein the third charging electrode is configured to be a positive power terminal of the second charger and the fourth charging electrode is configured to be a negative power terminal of the second charger.

4. The charging station of claim 3, wherein the first charging electrode and the third charging electrode are configured to contact a first charge-receiving electrode of the electric vehicle and the second charging electrode and the fourth charging electrode are configured to contact a second charge-receiving electrode of the electric vehicle.

5. The charging station of claim 4, wherein the first charging electrode is positioned substantially parallel to the third charging electrode.

6. The charging station of claim 4, further including a fifth charging electrode electrically connected to the first charger and the sixth charging electrode connected to the second charger, wherein the fifth charging electrode and the sixth charging electrode are configured to contact a third charge-receiving electrode of the electric vehicle.

7. The charging station of claim 6, further including a seventh charging electrode electrically connected to the first charger and an eighth charging electrode connected to the second charger, wherein the seventh charging electrode and the eighth charging electrode are configured to contact a fourth charge-receiving electrode of the electric vehicle.

8. The charging station of claim 1, wherein the first and the second pairs of charging electrodes are configured to contact first and second pairs of charge-receiving electrodes positioned on a roof of the electric vehicle.

9. The charging station of claim 1, wherein the first and the second pairs of charging electrodes are coupled to a charging connection that is configured to move towards and away from the first and second pairs of charge-receiving electrodes of the electric vehicle.

10. The charging station of claim 1, wherein the first and the second pairs of charging electrodes extend substantially transverse to the first and second pairs of charge-receiving electrodes of the electric vehicle.

11. The charging station of claim 1, further including a controller operatively coupled to the first and second chargers, wherein the controller is configured to independently vary the power output of the first and second chargers.

12. A charging station for charging an electric vehicle, comprising:
a first charging electrode and a second charging electrode electrically connected to a first charger, wherein the first charging electrode is configured to be a positive power terminal of the first charger and the second charging electrode is configured to be a negative power terminal of the first charger, and wherein the first charging electrode is configured to contact a first charge-receiving electrode of the electric vehicle and the second charging electrode is configured to contact a second charge-receiving electrode of the electric vehicle; and a third charging electrode and a fourth charging electrode electrically connected to a second charger, with isolated outputs from the first charger, wherein the third charging electrode is configured to be a positive power terminal of the second charger and the fourth charging electrode is configured to be a negative power terminal of the second charger, and wherein the third charging electrode is configured to contact the first charge-receiving electrode of the electric vehicle and the fourth charging electrode is configured to contact the second charge-receiving electrode of the electric vehicle, wherein, the first charger is configured to vary power output to the first and second charging electrodes independent of the power output of the second charger.

13. The charging station of claim 12, wherein the first and second chargers are configured to receive AC power and output DC power.

14. The charging station of claim 12, wherein the first, second, third, and fourth charging electrodes are configured to contact charging electrodes positioned on a roof of the electric vehicle.

15. The charging station of claim 12, further including a fifth charging electrode electrically connected to the first charger and the sixth charging electrode connected to the second charger, wherein the fifth charging electrode and the sixth charging electrode are configured to contact a third charge-receiving electrode of the electric vehicle.

16. The charging station of claim 15, further including a seventh charging electrode electrically connected to the first charger and an eighth charging electrode connected to the second charger, wherein the seventh charging electrode and the eighth charging electrode are configured to contact a fourth charge-receiving electrode of the electric vehicle.

17. A method of charging an electric vehicle at a charging station, comprising:

electrically connecting a first charging electrode and a second charging electrode of the charging station with a first charge-receiving electrode of the electric vehicle, wherein the first charging electrode is configured to be a positive power terminal of a first charger and the second charging electrode is configured to be the positive power terminal of a second charger;

electrically connecting a third charging electrode and a fourth charging electrode of the charging station with a second charge-receiving electrode of the electric vehicle, wherein the third charging electrode is configured to be a negative power terminal of the first charger and the fourth charging electrode is configured to be the negative power terminal of the second charger, wherein, the first charger directs power to the first and second charging electrodes independent of the power directed by the second charger during charging of the electric vehicle.

18. The method of claim 17, further including varying the power output of the first charger without varying the power output of the second charger.

19. The method of claim 18, further including electrically connecting a fifth charging electrode and a sixth charging electrode with a third charge-receiving electrode of the electric vehicle, wherein the fifth charging electrode is configured to be a ground terminal of the first charger and the sixth charging electrode is configured to be the ground terminal of the second charger.

20. The method of claim 18, wherein electrically connecting the first charging electrode and the second charging electrode with the first charge-receiving electrode includes decreasing a gap between the first and second charging electrodes with the first charge-receiving electrode positioned on a roof of the electric vehicle.

* * * * *